United States Patent
Costea et al.

(10) Patent No.: US 7,716,743 B2
(45) Date of Patent: May 11, 2010

(54) PRIVACY FRIENDLY MALWARE QUARANTINES

(75) Inventors: Mihai Costea, Redmond, WA (US); Adrian M. Marinescu, Sammamish, WA (US); Anil Francis Thomas, Sammamish, WA (US); Gheorghe Marius Gheorghescu, Redmond, WA (US); Kyle A. Larsen, Fort Myers, FL (US); Vadim N. Bluvstein, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1062 days.

(21) Appl. No.: 11/035,584

(22) Filed: Jan. 14, 2005

(65) Prior Publication Data

US 2006/0161988 A1 Jul. 20, 2006

(51) Int. Cl.
*G06F 11/00* (2006.01)
*H04L 29/06* (2006.01)
(52) U.S. Cl. .......................... 726/25; 713/165; 726/22
(58) Field of Classification Search .................. 726/25, 726/22; 713/165
See application file for complete search history.

(56) References Cited

U.S. PATENT DOCUMENTS

| | | | | |
|---|---|---|---|---|
| 7,328,303 | B1* | 2/2008 | Waterhouse et al. | 711/112 |
| 7,330,863 | B2* | 2/2008 | Carro | 707/205 |
| 2003/0158905 | A1* | 8/2003 | Petry et al. | 709/206 |
| 2003/0191911 | A1* | 10/2003 | Kleinschnitz et al. | 711/154 |
| 2004/0039926 | A1* | 2/2004 | Lambert | 713/189 |
| 2004/0073810 | A1* | 4/2004 | Dettinger et al. | 713/201 |
| 2004/0177110 | A1* | 9/2004 | Rounthwaite et al. | 709/202 |
| 2004/0186858 | A1* | 9/2004 | McGovern et al. | 707/200 |
| 2004/0255161 | A1* | 12/2004 | Cavanaugh | 713/201 |
| 2005/0065961 | A1* | 3/2005 | Aguren | 707/102 |
| 2005/0091655 | A1* | 4/2005 | Probert et al. | 718/100 |
| 2005/0097141 | A1* | 5/2005 | Loafman et al. | 707/200 |
| 2005/0114338 | A1* | 5/2005 | Borthakur et al. | 707/9 |
| 2005/0132070 | A1* | 6/2005 | Redlich et al. | 709/228 |
| 2005/0138110 | A1* | 6/2005 | Redlich et al. | 709/201 |
| 2005/0198169 | A1* | 9/2005 | Holten et al. | 709/206 |
| 2005/0262208 | A1* | 11/2005 | Haviv et al. | 709/206 |
| 2005/0283603 | A1* | 12/2005 | Raman et al. | 713/152 |
| 2005/0289221 | A1* | 12/2005 | Steele | 709/206 |
| 2006/0004819 | A1* | 1/2006 | Claudatos et al. | 707/101 |
| 2006/0130141 | A1* | 6/2006 | Kramer et al. | 726/23 |
| 2007/0150948 | A1* | 6/2007 | De Spiegeleer | 726/22 |

\* cited by examiner

*Primary Examiner*—Techane J Gergiso
(74) *Attorney, Agent, or Firm*—Workman Nydegger

(57) ABSTRACT

The present invention provides a system, method, and computer-readable medium for quarantining a file. Embodiments of the present invention are included in antivirus software that maintains a user interface. From the user interface, a user may issue a command to quarantine a file or the quarantine process may be initiated automatically by the antivirus software after malware is identified. When a file is marked for quarantine, aspects of the present invention encode file data with a function that is reversible. Then a set of metadata is identified that describes attributes of the file including any heightened security features that are used to limit access to the file. The metadata is moved to a quarantine folder, while the encoded file remains at the same location in the file system. As a result, the encoded file maintains the same file attributes as the original, non-quarantined file, including any heightened security features.

19 Claims, 4 Drawing Sheets

| FILE NAME | QUARANTINE TIME | INFECTING MALWARE |
|---|---|---|
| TASK.XLS | 4/10/04 AT 12:02 A.M. | STRANGE DAYS |
| RESUME.DOC | 4/14/04 AT 2:08 P.M. | MELISSA MACRO |
| PICTURE.JPG | 4/23/04 AT 09:38 A.M. | BRYANSK |
| MOVIE.AVI | 3/30/03 AT 06:02 A.M. | NETSKY |
| EXECUTABLE.EXE | 5/13/04 AT 02:55 A.M. | LOVE LETTER |

Fig.2.

PRIVACY FRIENDLY MALWARE QUARANTINES

FIELD OF THE INVENTION

The present invention relates to computing devices and, more particularly, to protecting a computing device against malware.

BACKGROUND OF THE INVENTION

As more and more computers and other computing devices are interconnected through various networks, such as the Internet, computer security has become increasingly more important, particularly from invasions or attacks delivered over a network or over an information stream. As those skilled in the art will recognize, these attacks come in many different forms, including, but certainly not limited to, computer viruses, computer worms, system component replacements, denial of service attacks, even misuse/abuse of legitimate computer system features—all of which exploit one or more computer system vulnerabilities for illegitimate purposes. While those skilled in the art will realize that the various computer attacks are technically distinct from one another, for purposes of the present invention and for simplicity in description, all malicious computer programs will be generally referred to hereinafter as computer malware, or more simply, malware.

When a computer system is attacked or "infected" by a computer malware, the adverse results are varied, including disabling system devices; erasing or corrupting firmware, applications, or data files; transmitting potentially sensitive data to another location on the network; shutting down the computer system; or causing the computer system to crash. Yet another pernicious aspect of many, though not all, computer malware is that an infected computer system is used to infect other computers.

A traditional defense against computer malware, and particularly computer viruses and worms, is antivirus software. Generally described, antivirus software scans data, looking for identifiable patterns associated with known computer malware. Frequently, this is done by matching patterns within the data to what is referred to as a "signature" of the malware. One of the core deficiencies in this malware detection model is that an unknown computer malware may propagate unchecked in a network until a computer's antivirus software is updated to identify and respond to the new computer malware.

When a malware infection occurs, the infection may be handled in one of many different ways. Preferably, the infected computing device is capable of being "cleaned" so that the malware is no longer resident. However, in some instances, the malware may be configured to employ self-preservation techniques to resist being cleaned. In this instance, cleaning the computing device may not be feasible or may only be possible with a software update. Alternatively, files associated with the malware may be deleted from the computing device. However, as known to those skilled in the art and others, some malware attach to innocuous "hosts" which contain user data that will be lost if an infected file is deleted.

In yet another alternative, the malware may be "quarantined." Typically, a quarantine occurs when data associated with the malware is altered to prevent execution of the malware. Quarantining malware is especially useful when a file may have been incorrectly identified as malware, the user wants to delay cleaning a file until a later time, or an infected file contains user data that needs to be saved. In some existing systems, a quarantined file is both prevented from executing program code and concealed from antivirus software that scans a computing device for malware. For example, one method of implementing a quarantine includes moving a file to a quarantine folder along with associated metadata that describes the location of the file. Among other things, the quarantine folder has established settings that prevent files from "executing" program code. To conceal the quarantined file from antivirus software, the data in the file is typically encoded. As a result, the file is not capable of causing harm to a computing device and will not be identified as malware if scanned by antivirus software.

In instances when one or more files are moved, attributes of the files may change in ways that are unexpected by users. For example, to prevent some users from accessing unauthorized data, heightened file system security features are implemented on some files/directories and not others. In this instance, a file may be encrypted and therefore inaccessible to unauthorized users who do not possess a "key." However, if the file is moved, the new directory that stores the file may not maintain the same heightened security features as the directory that originally stored the file. Thus, in instances when a file infected with malware is moved to a quarantine folder, user data may become accessible to unauthorized users even though the file was originally encrypted in a directory that implemented security features designed to prevent unauthorized access. More generally, attributes associated with a file in one directory may change in ways that are unexpected to users when the file is moved to a different directory.

In light of the above-identified problems, it would be beneficial to have a system and method of quarantining a file while allowing the file to retain its original attributes.

SUMMARY OF THE INVENTION

The present invention provides a way to quarantine a file that may be infected with malware. Data in a quarantined file is incapable of causing harm to a computer even though the file retains its original attributes. Also, files marked for quarantine are altered so that file data will not be identified as malware by antivirus software. One aspect of the present is a method for generating a quarantined file. More specifically, the method includes encoding a file that may be infected with malware with a function that is reversible. Then a set of metadata is identified that describes attributes of the file including any heightened security features that are used to limit access to the file. The metadata is stored in both a quarantine folder and with the encoded file data located in the file system. In this regard, the encoded file data is combined with the set of metadata to form a new "quarantine" file. The attributes associated with the quarantine file are set to match the attributes that were associated with the original file, which is deleted from the computing device.

Another aspect of the present invention is a method for restoring a quarantine file to its original state. To satisfy certain commands available from antivirus software, the present invention restores a quarantine file that contains encoded data back into its original decoded state. For example, antivirus software may be updated with new virus definitions. In this instance, the antivirus software may issue a command to perform a scan of a quarantine file to determine whether (1) the quarantine file is in fact infected with malware, and (2) whether the quarantine file may be cleaned of the malware. To satisfy these types of commands, the quarantine file is decoded and its original attributes are reinstated. Finally, a determination is made regarding whether the decoded file data is valid. If the file data is not valid an error occurred and an exception handler attempts to recover from the error condition.

In yet another aspect of the present invention a software system for quarantining a file and restoring the file in response to commands is provided. The software system includes, but is not limited to, a quarantine module, user interface, and a quarantine folder. In one embodiment of the present invention, the quarantine module is operative to generate a quarantine file that contains both encoded file data and metadata that describes attributes of the original file. A copy of the metadata is stored in the quarantine folder along with metadata associated with other files that are quarantined. The user interface is operative to search the quarantine folder for metadata associated with quarantined files and display the metadata to users. Also, the user interface accepts commands that include but are not limited to commands to quarantine, restore, submit, find, rescan, and delete a quarantine file.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2 is a pictorial depiction of an exemplary user interface that includes graphical elements for accepting commands implemented in accordance with the present invention;

DETAILED DESCRIPTION OF THE PREFERRED EMBODIMENT

The present invention provides a system, method, and computer-readable medium for quarantining a file. Data in a quarantined file is incapable of causing harm to a computer even though the file retains the same attributes as the original, non-quarantined file. For example, file data is stored in the same location in the file system without being moved to a special folder. Also, a quarantine file is altered so that file data will not be identified as malware by antivirus software that performs a scan of the file system. Embodiments of the present invention are included in antivirus software that maintains a user interface. From the user interface, a user may issue a command to quarantine a file or the quarantine process may be initiated automatically by the antivirus software after malware is identified. In any event, when a file is marked for quarantine, aspects of the present invention encode data in the file with a function that is reversible. Then a set of metadata is identified that describes attributes of the file including any heightened security features that are used to limit access to the file. The metadata is stored in both a quarantine folder and with the encoded file data located in the file system. In this regard, the encoded file data is combined with the set of metadata to form a quarantine file. The attributes associated with the quarantine file are set to match the attributes that were associated with the original, non-quarantined file.

Although the present invention will primarily be described in the context of quarantining a file that is identified as being infected with malware, those skilled in the relevant art and others will appreciate that the present invention is also applicable to other types of software systems. The following description first provides an overview of a system in which the present invention may be implemented. Then methods that implement the present invention are described. The illustrative examples provided herein are not intended to be exhaustive or to limit the invention to the precise forms disclosed. Similarly, any steps described herein may be interchangeable with other steps, or combinations of steps, in order to achieve the same result.

Figure 1:
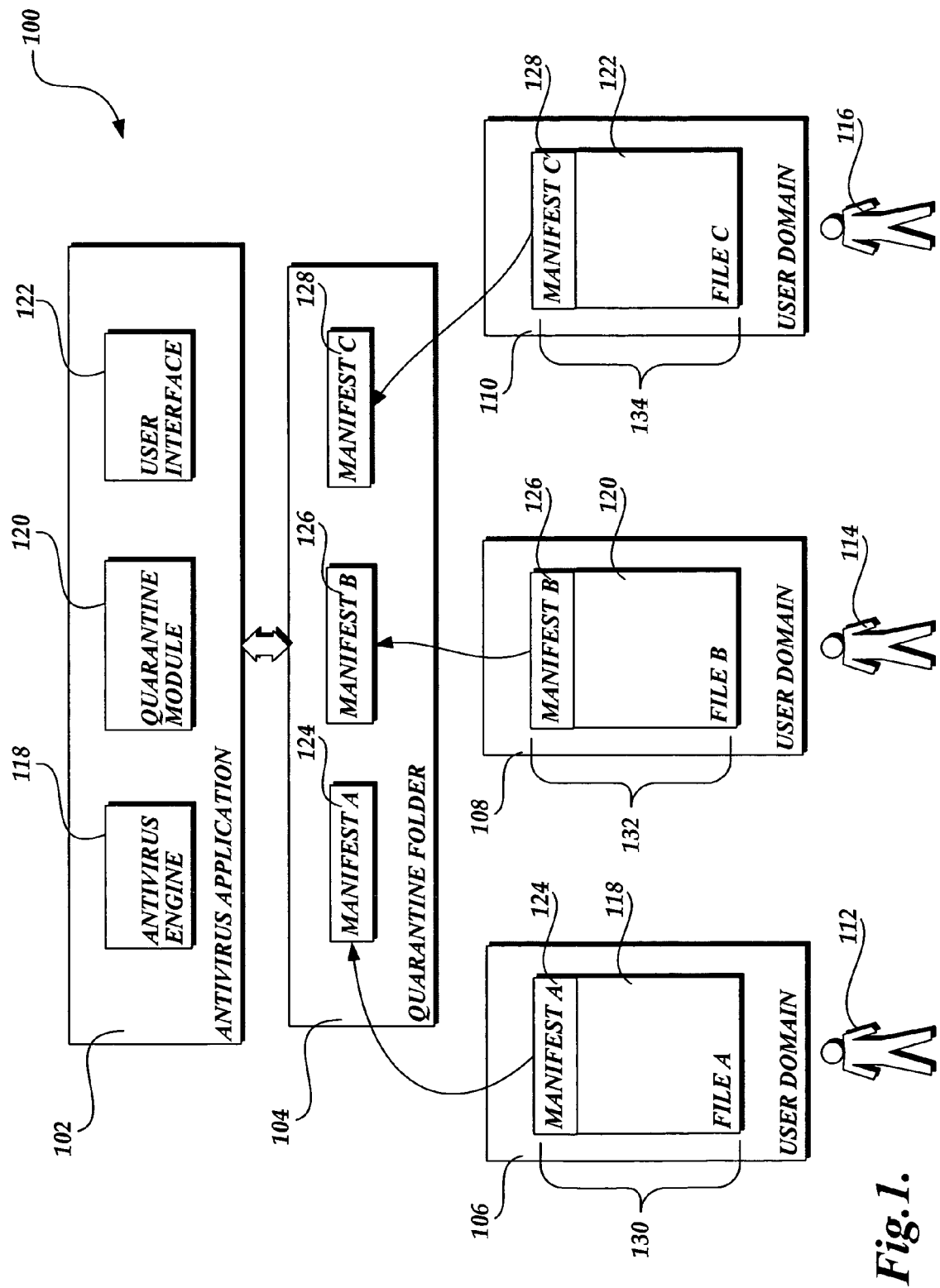
FIG. 1 is a block diagram that illustrates components of a quarantine system operative to quarantine a file in accordance with the present invention.

Referring now to FIG. 1, the following is intended to provide an exemplary overview of one suitable computer environment 100 in which aspects the invention may be implemented. The illustrated environment 100 comprises an antivirus application 102, quarantine folder 104, and user domains 106, 108, and 110 that are associated with users 112, 114, and 116. As illustrated in FIG. 1, the antivirus application 102 includes an antivirus engine 118, quarantine module 120, and user interface 122. Also, user domains 106, 108, and 110 maintain FILE A 118, FILE B 120, and FILE C 122, which are associated with MANIFEST A 124, MANIFEST B 126, and MANIFEST C 128, respectively.

Since many components and functions of the antivirus application 102 and antivirus engine 118 are not important for an understanding of the present invention, they are not illustrated in FIG. 2 or described in the accompanying text. With respect to the present invention, the antivirus engine 118 scans files to determine whether the files are infected with malware. When malware is detected, an attempt to clean the malware is undertaken. However, as described above, in some instances cleaning the malware may not be possible. When this occurs, software implemented routines in the quarantine module 120 (described below) may be used to create a quarantine file. In one embodiment of the present invention, when the antivirus engine 118 is updated with current malware definitions, files that are quarantined are scanned for malware by the antivirus engine 118 to determine whether the files are actually infected.

Increasingly, computing devices are configured to serve multiple users; each user having a different user profile that defines a computer configuration with regard to that user. Multiple user scenarios are especially prevalent in networking environments in which users share data. In this type of system, computing devices track which users have access to resources stored in the network. For example, some computing devices maintain access control lists ("ACLs") that define which users, or groups of users, that may access particular files. For purposes of the present application, the resources that a user may access is referred to as the user domain. Thus, as illustrated in FIG. 1, user 112 may access file 118 since the file 118 is in the domain 106 associated with the user 112. However, user 112 may not access files 120 and 122, since those files are only in the domains that are associated with users 114 and 116.

As illustrated in FIG. 1, the antivirus application 102 includes a quarantine module 120 for quarantining files that may be infected with malware. In general terms describing one embodiment of the present invention, the quarantine module 120 creates a quarantine file that is comprised of two components. The first component consists of file data encoded by routines in the quarantine module 120. Since the function used to encode the data is reversible, the data may be decoded at some later time. The second component is a manifest that consists of a set of metadata that describes attributes of the file that is being quarantined. The set of metadata includes traditional metadata that is typically associated with a file including name, path in the file system, ACLs, and the like. Also, the set of metadata in the manifest includes data that describes the quarantine such as time of the quarantine, current version number of the antivirus engine 118, and the malware identified. For example, FIG. 1 illustrates three quarantine files 130, 132, and 134 that consist of a file with encoded data and a manifest. More specifically, FILE A 118 and MANIFEST A 124 collectively form quarantine file 130. Similarly, FILE B 120 and FILE C 122 along with MANIFEST B 126 and MANIFEST C 128 collectively form quarantine files 132 and 134, respectively.

As illustrated in FIG. 1, a copy of the manifests 124-128 are replicated in the quarantine folder 104. When generating the quarantine files 130-134 the quarantine module 120 causes the manifests 124-128 to be replicated in a quarantine folder 104 that is specifically designed for use by the antivirus application 102. As described in more detail below, replicating the manifests 124-128 at a single location provides the antivirus application 102 with an easy way to identify all files in a file system that are quarantined.

The antivirus application 102 illustrated in FIG. 1 also includes a user interface 122. As known to those skilled in the art and others, a user interface is an input/output system characterized by the use of graphics on a computer display to communicate with a computer user. For example, information regarding files that are quarantined may be displayed on the user interface 122. In this regard, the user interface 122 may search the quarantine folder 104 for metadata associated with the files that are quarantined. Also, as described in further detail below with reference to FIG. 2, the user interface 122 allows a user to click buttons and generate commands in order to quarantine files or restore files from quarantine.

As illustrated in FIG. 1, each component of the antivirus application 102—e.g., the antivirus engine 118, the quarantine module 120, and the user interface 122—are interconnected and able to communicate with other components. As known to those skilled in the art and others, FIG. 1 is a simplified example of one antivirus application 102 capable of performing the functions implemented by the present invention. Actual embodiments of the antivirus application 102 will have additional components not illustrated in FIG. 1 or described in the accompanying text. Also, FIG. 1 shows one component architecture for creating a quarantine file, but other component architectures are possible.

FIG. 2 is a pictorial diagram illustrating an exemplary user interface 122 that is depicted in FIG. 1. The user interface 122 includes columns for displaying three types of metadata that are associated with files that are quarantined, including file name 200, quarantine time 202, and infecting malware 204. In one embodiment of the present invention, the routines in the user interface 122 search the quarantine folder 104 (FIG. 1) for metadata that describes attributes of files that are quarantined. Some of the metadata contained in the quarantine folder 104 is displayed as list elements in the user interface 122. Typically, all files on a computing devices that are quarantined will have associated metadata in the quarantine folder 104. Thus, the user interface 122 will typically display information about each file on a computing device that is quarantined. The columns illustrated in FIG. 2 should be construed as exemplary and not limiting as the user interface 122 may display different types of metadata. Also, columns may be added or removed from the user interface 122 without departing from the scope of the present invention.

From the user interface 122, a user may issue commands that are handled by the present invention. In this regard, the exemplary user interface 122 illustrated in FIG. 2 contains embedded controls in the form of buttons for generating commands. More specifically, the user interface 122 includes an "add" button 206, a "restore" button 208, a "delete" button 210, a "submit" button 212, a "rescan" button 214, and a "find" button 216. When a user activates the "add" button 206 with a pointer communicatively connected to a mouse or similar input mechanism, any selected files are marked for quarantine. In response, the present invention quarantines the selected files in accordance with the method described below with reference to FIG. 3. In an alternative embodiment, a file may be quarantined after the antivirus engine 118 scans the file and determines that the file is infected with malware. If an attempt to clean the malware fails, the user will be presented with an option to quarantine the infected file.

As illustrated in FIG. 2, the user may also activate the restore button 206 in order to remove a file from quarantine. In response, the present invention restores the selected files to their original state in accordance with the method described below with reference to FIG. 4. A user may determine that a quarantined file does not contain data that needs to be saved. In this instance, files may be selected and the delete button 210 activated in order to remove the files from the computer. Also, the submit button 212 allows users to transmit data such as an infected file to an antivirus software vendor. In this instance, a user may select a file displayed on the user interface 122 and activate the submit button 212 to cause the file to be transmitted to a remote database. To satisfy the submit command, a copy of the data in the quarantine file is restored to its original, non-quarantined state in accordance with the method described below with reference to FIG. 4.

As illustrated in FIG. 2, the user interface 122 also contains a rescan button 214. As mentioned previously, a quarantine file contains encoded data that will not be identified as malware by antivirus software 102 even in instances when the non-quarantined file was infected with malware. In order to scan a quarantine file to determine if the file is actually infected with malware, the file is restored to its original state. Thus, to satisfy the rescan command, the present invention (1) restores the quarantine file in accordance with the method described below with reference to FIG. 4, and (2) causes the antivirus engine 118 to scan the restored file for malware.

The user interface 122 also contains a find button 216 that, when activated, generates a command that is satisfied by the present invention. As mentioned above, all files on a computing devices that are quarantined will typically have associated metadata in the quarantine folder 104. However, increasingly, hardware devices are available that are easily moved between computing devices. In instances when a quarantine file is stored on a mobile hardware device and moved between computing devices, the quarantine folder 104 may not contain metadata for the file. Thus, the command generated when the find button 216 is activated is satisfied with a search for files that are quarantined. When a previously unknown quarantine file is identified, the manifest associated with the file is copied to the quarantine folder 104. As a result, an entry for the previously unknown quarantine file will be added to the user interface 122.

Figure 3:
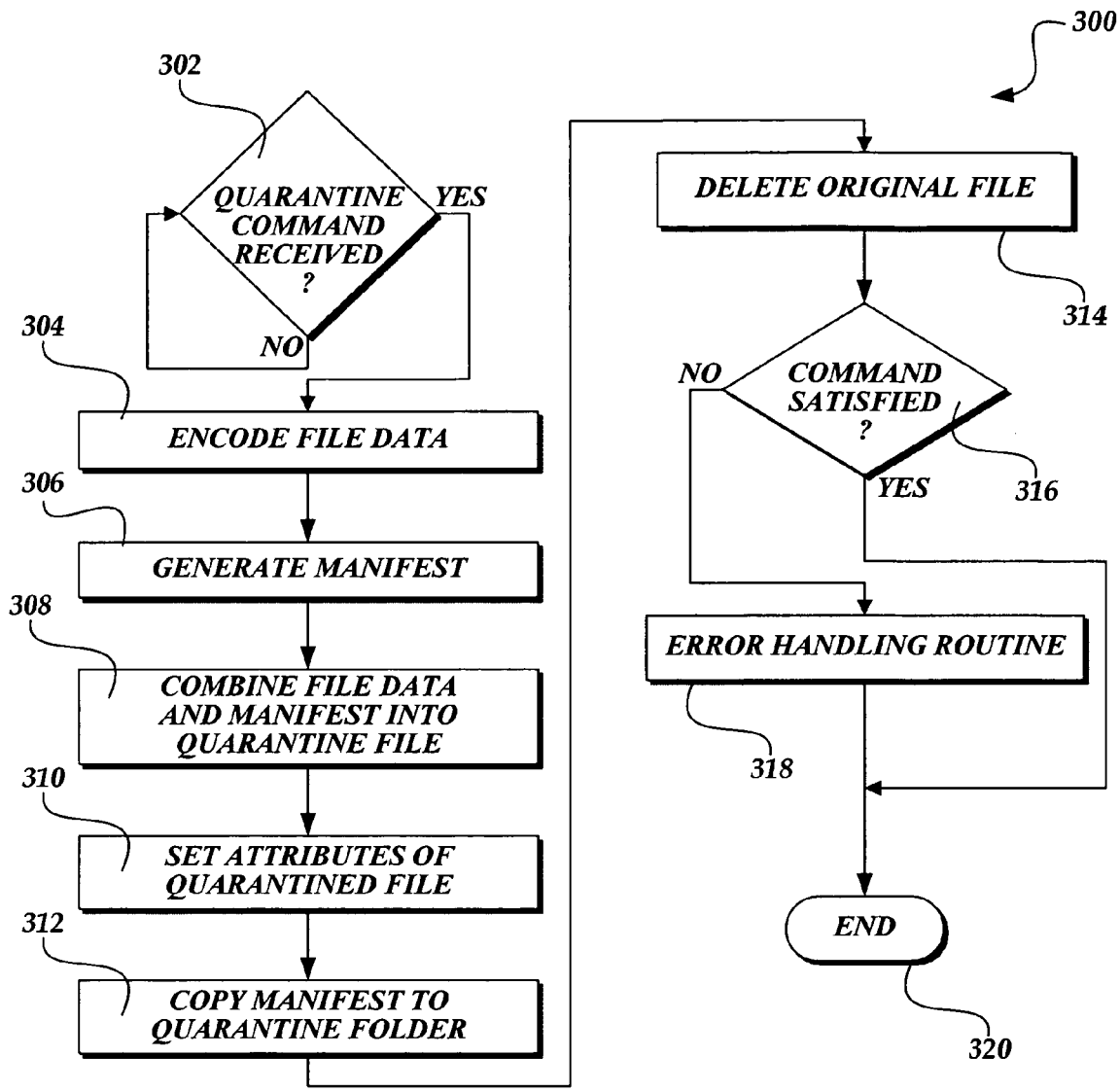
FIG. 3 is a flow diagram illustrating an exemplary embodiment of a quarantine method that may be used to quarantine a file in accordance with the present invention.

FIG. 3 is a flow diagram illustrating one exemplary embodiment of a quarantine method 300 formed in accordance with the present invention. The quarantine method 300 provides a way to quarantine a file so that any malicious functionality in the file is rendered safe. A quarantined file is stored in the same location in the file system as the original, non-quarantined file and retains the same attributes. In summary, the quarantine method 300 encodes data in a file marked for quarantine with a function that is reversible. Then a set of metadata is identified that describes attributes of the file including any heightened security features that are used to limit access to the file. The metadata is stored in both a quarantine folder and with the encoded file data in the file system. In this regard, the encoded file data is combined with the set of metadata to form a quarantine file. With continuing reference to FIGS. 1-2 and the accompanying descriptions, an exemplary quarantine method 300 illustrated in FIG. 3 will now be described.

As illustrated in FIG. 3, the quarantine method 300 begins at block 302 where it remains idle until a command to quarantine a file is received. As mentioned above, the present invention provides a user interface 122 operative to accept a user-generated command to quarantine a file. However, a command to quarantine a file may be received in other contexts not described previously. For example, a user preference may be established so that certain files are quarantined automatically at the occurrence of an event. In this instance, antivirus software may identify malware in a file and attempt to clean the malware. If the file infected with malware is incapable of being cleaned, then a command to quarantine the file may be generated automatically based on a user preference. However, as known to those skilled in the art and others, commands to quarantine a file may be generated in other contexts, and the examples provided above should be construed as exemplary and not limiting.

At block 304, the quarantine method 300 encodes data in the file that is the object of the quarantine command received at block 302. In one embodiment of the present invention, the encoding performed at block 304 uses "exclusive-OR" (hereinafter referred to as "XOR") encryption. As known to those skilled in the art and others, XOR encryption is implemented using the Boolean algebraic function XOR. The XOR algebraic function is a binary operation that takes two arguments and returns true if one, and only one, of the two arguments is true. Typically, XOR encryption uses a randomly generated key as one argument to the binary function and file data reduced to a sequence of bits as the second argument. Stated differently, at block 304 the XOR operation is repeatedly applied with a randomly generated key as one argument and bits that represent data in a file as the second argument. The output produced by the XOR operation is stored in a new file and appears to be an entirely random series of information. Reversing the XOR operation when the value of the key and the encoded file data is known is a simple operation. However, when the value of the key or encoded data is not available, reversing the operation is nearly impossible. It should be well understood that the XOR encryption described above is merely exemplary and should not be construed as limiting. The present invention may encode data at block 304 using different techniques not described herein.

As illustrated in FIG. 3, at block 306, the quarantine method 300 generates a manifest of the file that is the object of the quarantine command received at block 302. As described previously, a manifest consists of a set of metadata that describes attributes of a file that is the object of a quarantine command. In this instance, the manifest includes traditional metadata that is typically associated with a file such as file name, path in the file system, and ACLs. Also, the manifest includes metadata that describes information about the quarantine process including, but not limited to, time of the quarantine, version number of the current antivirus engine 118 (FIG. 1), and the identity of malware infecting the file. In one embodiment of the present invention the manifest contains metadata that is in the Extensible Markup Language ("XML") format. Since metadata in the manifest may be identified and stored in XML format using techniques that are generally known in the art, the techniques used at block 306 will not be described in further detail here.

At block 308, the quarantine method 300 creates a quarantine file. As mentioned previously, a quarantine file is comprised of two components that includes encoded file data and a manifest that contains a set of metadata. At block 308, the encoded file data and manifest are combined into a single file (referred to herein as the "quarantine file"). In one embodiment of the present invention, the quarantine file is compressed into a "CAB" file. As known to those skilled in the art and others, a CAB file is an archive file type that requires less storage space than non-archived files. In order to easily identify files manipulated by the present invention, a unique file extension is assigned to the quarantine file.

As illustrated in FIG. 3, the quarantine method 300, at block 310, sets the attributes of the quarantine file, created at block 308, to match the file that was the object of the quarantine command received at block 302. As known to those skilled in the art and others each file in a file system maintains a set of attributes that provides the operating system and application software information about the file. In most instances, file attributes are automatically set through inheritance. Thus, when the quarantine file is created, a set of default attributes are associated with the file based on where the file is located in the file system. Since the present invention stores the quarantine file in the same directory as the file that was the object of the quarantine command, the default attributes assigned to the quarantine file will typically match the attributes associated with the file that was the object of the quarantine command. However, in some instances, the default attributes may not match. Thus the quarantine method 300 may set the attributes of the quarantine file at block 310. To set the attributes, one or more function calls are made to an Application Programming Interface ("API") that is provided by the operating system.

As mentioned previously, in instances when a file is moved between directories, attributes of the file may change in ways that are unexpected by users. Thus, by storing the quarantine file in the same directory as the file that is the object of the quarantine command, unexpected behaviors are prevented. For example, the quarantine file will be protected with the same file system security features (i.e., encryption) as the original, non-quarantined file. Also, the quarantine file will have the same ACLs, permissions, owner, read bit value, and other file attributes as the original file. As a result, user data in the quarantine file will not be accessible to unauthorized users.

At block 312, the manifest generated at block 306 is copied to a central location such as the quarantine folder 104 (FIG. 1). As mentioned previously, a manifest consists of a set of metadata that describes attributes of a file that is the object of a quarantine command. The user interface 122 searches manifests in the quarantine folder 104 so that metadata may be displayed to the user. Thus, at block 316, the manifest is copied to a central location (i.e., quarantine folder 104) that is accessible to routines in the user interface 122. As a result, metadata may be displayed in an event-driven system that supports user-generated commands for performing actions on files that are quarantined. Also, the manifests are created with the same attributes (i.e. ACLs) as the file that is the object of the quarantine command. Since the attributes of the original file are preserved, information in a file that is quarantine will not be disclosed to any unauthorized domains. However, a manifest in the quarantine folder 104 is created with privileges so that an administrator may read, delete, or perform other actions on the manifest.

At block 314, the original, non-quarantined file that was the object of the quarantine command received at block 302 is deleted. Since techniques for deleting a file are generally known in the art, the technique used by the present invention at block 314 will not be described here. As mentioned previously, deleting the original file prevents antivirus software from repetitively scanning the file for malware. Also, deleting the file prevents the user from issuing a command to execute any malware program code in the file.

At decision block 316, the quarantine method 300 determines whether the quarantine command received at block 302 was successfully satisfied. As known to those skilled in the art and others, software routines may fail for any number of reasons. For example, a computing device may not have sufficient memory to create a quarantine file. In this instance, an operating system will typically return information that indicates the type of error condition that occurred. In any event, at block 316, the method 300 determines whether the quarantine file was successfully created or an error condition occurred. If the file was created successfully, the quarantine method 300 proceeds to block 320 where it terminates. If an error condition occurred, the method proceeds to block 318.

At block 318 the error condition identified at block 316 is handled. If an error condition is identified, then previously developed exception handlers will attempt to recover from the error condition. As known to those skilled in the art and others, exception handlers are event driven routines that use a structured method of handling error. In some instances, an error condition is recoverable and the quarantine command may be satisfied. In other instances, the error condition is critical and the command may not be satisfied. Then, the quarantine method 300 proceeds to block 320 where it terminates.

Now with reference to FIG. 4, one exemplary embodiment of a restore method 400 formed in accordance with the present invention will be described. The restore method 400 provides a way to restore a quarantine file back to its original state. In many respects, the restore method 400 is the converse of the quarantine method 300 described above with reference to FIG. 3. With continuing reference to FIGS. 1-3 and the accompanying descriptions, an exemplary restore method 400 illustrated in FIG. 4 will now be described.

Figure 4:
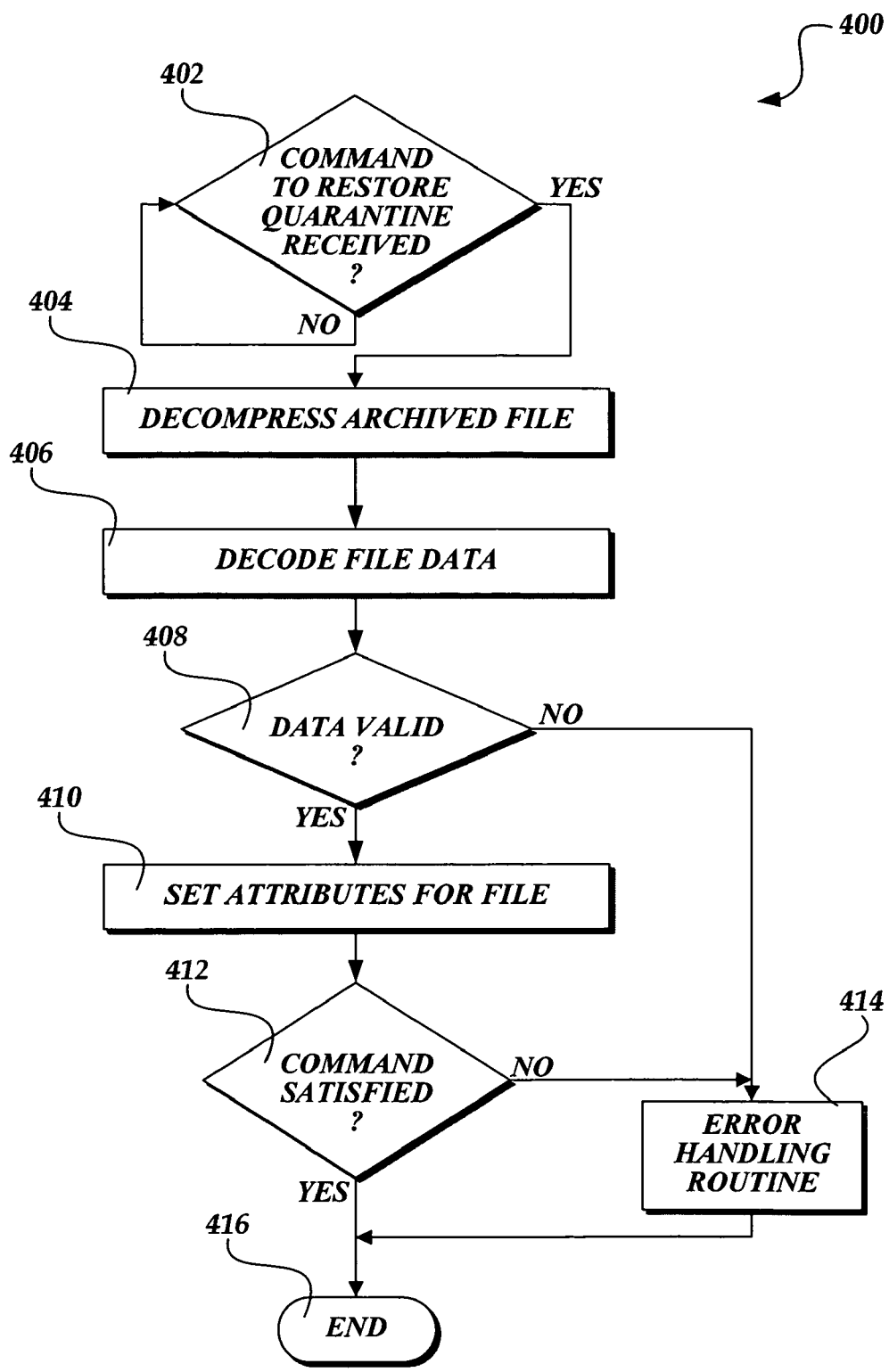
FIG. 4 is a flow diagram illustrating an exemplary embodiment of a restore method that may be used to restore a quarantine file in accordance with the present invention.

As illustrated in FIG. 4, the restore method 400 begins at block 402 where it remains idle until a command to restore a file from quarantine is received. A command to restore a file from quarantine may be received in many different contexts of which the following are only examples. As mentioned above and described above with reference to FIG. 2, the present invention provides a user interface 122 operative to accept user-generated commands. Several commands available from the user interface, will cause a file to be restored. For example, activation of the restore button 208 will cause a file to be restored. However, activation of the submit button 212 and rescan button 214 will also cause a file to be restored so that an additional action may be performed on the restored file data.

At block 404, the quarantine file that is the object of the restore command received at block 402 is decompressed. The restore method 400 is designed to work in conjunction with the quarantine method 300 described above with reference to FIG. 3. As described previously, in one embodiment of the quarantine method 300 a file is created that is in CAB format. At block 404, the quarantine file that is the object of the restore command is decompressed so that the contents of the file may be decoded. Since techniques for decompressing a file in an archived format are generally known in the art, the technique used at block 404 by the present invention will not be described here.

At block 406, encoded file data in the quarantine file is decoded back to its original state. In one embodiment of the present invention, the encoding performed by the quarantine method 300 uses XOR encryption. To decode file data at block 406, the XOR algebraic operation is repeatedly applied to successive bits of data in the quarantine file, along with the randomly generated key. The output produced is the data that was originally encoded by the quarantine method 300. However, as mentioned previously the present invention may encode data using other techniques not described herein. Thus, the embodiment of the present that encodes and decodes file data using the XOR Boolean function should be construed as exemplary and not limiting.

As illustrated in FIG. 4, at decision block 408, the restore method 400 determines whether the file data produced at block 406 is valid. In one embodiment of the present invention, a checksum is used to determine if the file data is valid. As known to those skilled in the art and others, a checksum is a redundancy check where basic components of a file, typically the number of bytes, are recorded. Then, at some later time, the contents of the file are validated to make insure that the file data is valid. In this instance, the number of bytes in a file is recorded before being encoded. Then, at block 408, after decoding has occurred, the restore method 400 determines if the number of bytes in the file remained the same through the encoding/decoding process. If the checksum indicates that the file data is not valid, the restore method 400 proceeds to block 414 described below. Conversely, if the checksum indicates that the file data produced is valid, the restore method 400 proceeds to block 410.

At block 410, the restore method 400 sets the attributes of the non-quarantined file that contains the file data decoded at block 406. As described with reference to FIG. 3 (at block 310), in most instances, file attributes are automatically set through inheritance. Since the present invention stores both the encoded/decoded file data in the same directory, most, if not all file attributes are set automatically when a file is created. However, in some instances, the inherited attributes of the file that contains the decoded file data may not match the attributes of the quarantine file. Thus the restore method 400 may set certain file attributes at block 410 by making one or more API calls. Also, at block 410, the restore method 400 may perform administrative operations. For example, the manifest stored in the quarantine folder 104 (FIG. 1) that is associated with the quarantine file is deleted. As a result, the file will no longer maintain an entry in the user interface 122.

At decision block 412, the restore method 400 determines whether the restore command received at block 402 was successfully satisfied. As mentioned above, software routines may fail for any number of reasons. At block 412, the method 400 determines whether the restore command was satisfied or if an error condition occurred. If the command was satisfied, the quarantine method 400 proceeds to block 416 where it terminates. Conversely, if an error condition occurred, the method proceeds to block 414.

At block 414 the error condition identified at block 412 is handled. If an error condition is identified, then previously developed exception handlers will attempt to recover from the error condition. In some instances, an error condition is recoverable and the restore command will be satisfied. In other instances, the error condition is critical and the command can not be satisfied. Then, the method 400 proceeds to block 416 where it terminates.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A computer-implemented method for generating a quarantine file from a regular file identified as being infected with a malware, the method comprising:
   encoding data in the regular file with a reversible function;
   identifying a set of metadata that describes security attributes of the regular file, the security attributes controlling access to the regular file;
   detecting that the regular file is infected with the malware and, in response, generating the quarantine file;
   combining the encoded file data and the set of metadata in the generated quarantine file;
   setting security attributes of the generated quarantine file to match the security attributes of the regular file;
   copying the set of metadata to a central location that is accessible to a user interface while maintaining the original set of metadata in the generated quarantine file, wherein the user interface displays the set of metadata to a user; and
   deleting the regular file after the encoded data and the set of metadata are stored in the quarantine file.

2. The computer-implemented method as recited in claim 1, further comprising applying security features associated with the regular file to the quarantine file.

3. The computer-implemented method as recited in claim 1, further comprising after deleting the regular file after the encoded data and the set of metadata are stored in the quarantine file, evaluating whether deletion has been satisfied and, when deletion has failed, calling an error handling routine.

4. The computer-implemented method as recited in claim 1, wherein encoding data in the regular file includes performing exclusive-OR encryption.

5. The computer-implemented method as recited in claim 4, wherein performing exclusive-OR encryption includes:
   generating a random key; and
   applying the exclusive-OR algebraic function to file data and the random key.

6. The computer-implemented method as recited in claim 1, wherein the quarantine file that contains the encoded file data and the set of metadata is compressed into an archive file.

7. The computer-implemented method as recited in claim 1, wherein the set of metadata are stored in a manifest that consists of the set of metadata.

8. The computer-implemented method as recited in claim 1, where in the quarantine file that contains the encoded file data and the set of metadata remains in a same location in the file system as the regular file.

9. The computer-implemented method as recited in claim 1, wherein the quarantine file does not contain data that matches any malware signature.

10. The computer-implemented method as recited in claim 1, wherein setting attributes of the quarantine file to match the attributes of the regular file includes making function calls to an application programming interface.

11. The computer-implemented method as recited in claim 1, further comprising:
   receiving a request to restore the regular file from the quarantine file and, in response;
   decompressing the generated quarantine file to generate restored encoded file data and restored metadata describing security attributes;
   decoding the restored encoded file data in the generated quarantine file;
   storing the restored decoded data in a second regular file; and
   setting security attributes of the second regular file to match the security attributes that are recorded in the metadata included in the set of metadata included in the generated quarantine file, wherein a duplicate copy of the metadata is stored in the central location.

12. The computer-implemented method as recited in claim 11, wherein in response to receiving the request to restore the regular file from quarantine, the method further includes automatically removing the duplicate copy of the metadata from the central location after setting the security attributes of the second regular file.

13. The computer-implemented method as recited in claim 11, wherein the encoded file data is decoded using the exclusive-OR algebraic function.

14. A user computing system for generating a quarantine file from a regular file identified as being infected with malware, the user computing system comprising:
   a processor; and
   a computer-readable storage media having stored thereon an antivirus application accessible to the processor, the antivirus application including;
      an antivirus engine that, when executed by the processor, detects the malware in the regular file on the user computing system;
      a quarantine module that, when executed by the processor, causes the user computing system to:
         encode the regular file data;
         generate the quarantine file that contains the encoded file data and a metadata that describes security attributes of the regular file detected to have malware, the security attributes controlling access to the regular file;
         create a duplicate copy of the metadata and store the duplicate copy of the metadata in a quarantine folder also stored on the computer-readable storage media of the user computing system;
         apply the security attributes of the regular file to the quarantine file; and
         delete the regular file after the encoded file data and the metadata are stored in the quarantine file; and
      a user interface that, when executed by the processor, causes the user computing system to:
         search the quarantine folder for the duplicate copy of the metadata and display the metadata to a user; and
         accept a command to quarantine the regular file, wherein the user interface is further configured to accept commands to:
            scan the quarantine file for malware; and
            submit the quarantine file to an antivirus vendor.

15. The system as recited in claim 14, wherein the antivirus engine detects malware by identifying data that is characteristic of malware.

16. The user computing system as recited in claim 15, wherein the quarantine module is further configured to decode data in the quarantine file to allow the data to be scanned for malware by the antivirus engine.

17. The user computing system as recited in claim 14, wherein the user interface accepts a command to restore a quarantine file, wherein the quarantine module converts the quarantine file back into the regular file in response to the command.

18. The user computing system as recited in claim 14, wherein the quarantine file and the regular file are stored in the same location in the file system and maintain the same file attributes.

19. The user computing system as recited in claim 14, wherein the regular file and the quarantine file are protected from unauthorized access with heightened security features.

* * * * *